United States Patent [19]

Jeffer et al.

[11] Patent Number: 5,797,160
[45] Date of Patent: Aug. 25, 1998

[54] ARTICULATED WINDSHIELD WIPER BLADE ASSEMBLY

[75] Inventors: Peter H. Jeffer. New York. N.Y.;
Michel Fernandes. E. Freetown. Mass.

[73] Assignee: New-View Windshield Wiper, L.P., Freeport. N.Y.

[21] Appl. No.: 955,646

[22] Filed: Oct. 22, 1997

Related U.S. Application Data

[63] Continuation-in-part of Ser. No. 781,277, Jan. 10, 1997, Pat. No. 5,742,974, which is a continuation-in-part of Ser. No. 708,669, Sep. 5, 1996, Pat. No. 5,644,814, which is a continuation-in-part of Ser. No. 634,346, Apr. 18, 1996, Pat. No. 5,572,764.

[51] Int. Cl.$^6$ ............................................. B60S 1/38
[52] U.S. Cl. ........................ 15/250.361; 15/250.451; 15/250.33; 15/250.48
[58] Field of Search .................. 15/250.451, 250.452, 15/250.48, 250.361, 250.33, 245, 250.44, 250.41, 250.4

[56] References Cited

U.S. PATENT DOCUMENTS

| | | | |
|---|---|---|---|
| 2,179,451 | 11/1939 | Horton | 15/250.33 |
| 3,961,395 | 6/1976 | Journee | 15/250.361 |
| 4,698,874 | 10/1987 | Fritz, Jr. | 15/250.33 |
| 5,392,488 | 2/1995 | Li | 15/250.451 |

FOREIGN PATENT DOCUMENTS

| | | | |
|---|---|---|---|
| 1047648 | 7/1953 | France | 15/250.33 |
| 2189383 | 10/1987 | United Kingdom | 15/250.451 |

*Primary Examiner*—Gary K. Graham
*Attorney, Agent, or Firm*—Salter & Michaelson

[57] ABSTRACT

An articulated twin spline windshield wiper blade assembly includes an elongated, resilient, thin-walled polymeric female spline of relatively high durometer having a generally planar backbone, and two opposing arcuate spline legs which extend downwardly from the backbone and cooperate with the backbone to define a cylindrical spline channel. The wiper blade assembly further includes an elastomeric male spline having a cylindrical body portion rotatably journaled within the spline channel of the female spline. The male spline further includes a neck portion depending from the body portion, and a wiping portion depending from the neck portion. The wiping portion includes opposing wiping edges which are alternately engagable with a surface to be wiped upon rotation of the male spline within the spline channel. The specific selections of material and dimensions of the male and female splines provide a conflicting combination of the proper amount of flexibility of the female spline to allow the spline to properly conform to the curved surface of the windshield, proper rigidity of the backbone of the wiper to support proper engagement forces with the windshield, proper flexibility of the female spline legs relative to the backbone to prevent the legs from squeezing the male spline too tightly during rotation, and the removal of excess flashing material from the outer surfaces of the male spline. To further reduce friction and resistance to rotation, the cylindrical body portion of the male spline is truncated at its uppermost edge.

16 Claims, 2 Drawing Sheets

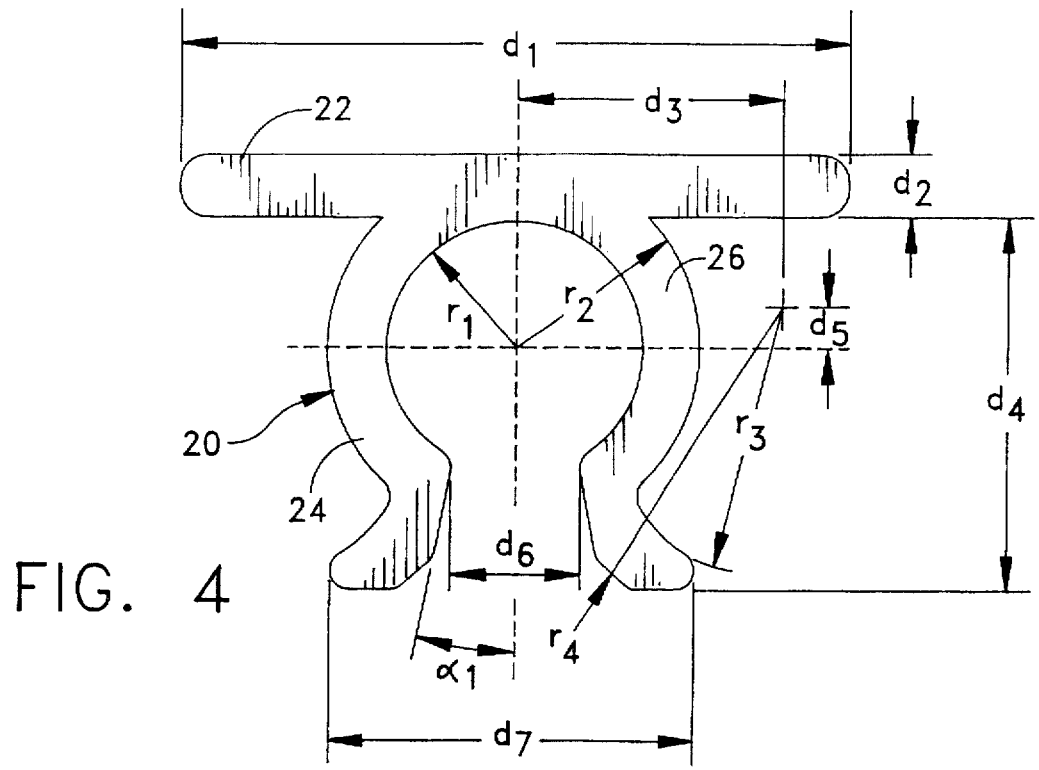
FIG. 4
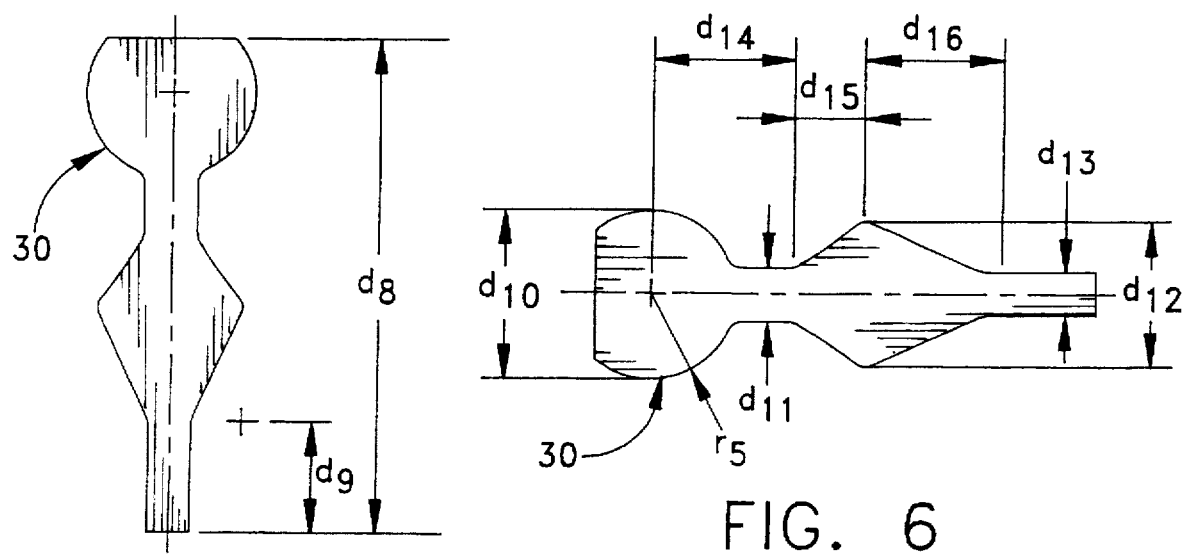
FIG. 5
FIG. 6

ARTICULATED WINDSHIELD WIPER BLADE ASSEMBLY

RELATED APPLICATION

This application is a continuation in part of application Ser. No. 08/781,277 filed Jan. 10, 1997, (now U.S. Pat. No. 5,742,974) which is a continuation-in-part of application Ser. No. 08/708,669, filed Sep. 5, 1996 (now U.S. Pat. No. 5,644,814), which is a continuation-in-part of application Ser. No. 08/634,346 filed Apr. 18, 1996 (now U.S. Pat. No. 5,572,764).

BACKGROUND AND SUMMARY OF THE INVENTION

Windshield wiper blade assemblies that utilize rotation of a wiping blade relative to a carrier are known in the art. While such known blade assemblies exhibit improved wiping performance, they fail to solve a problem associated with positive articulation or "flip" of the wiper blade as well as the speed of the "flip." Specifically, the wiper blades of the known articulated blade assemblies exhibit relatively high resistance to rotation thereby inhibiting the "flip" of the wiper blade. The main problem with the prior art wipers seems to be that the male spline binds up in the female spline when the wiper assembly is flexed in the Y-direction, i.e. when the spline is forced downwardly into engagement with the convex surface of the windshield, and then articulated back and forth.

The instant invention provides an articulated twin-spline windshield wiper blade assembly which is specially designed provide adequate flexure to the female spline and to reduce friction during rotation, thereby optimizing the "flip" of the wiper blade. One of the most critical aspects of developing a new design for an articulated wiper is an in-depth analysis of the mechanics of articulated wiping on convex, slanted windshields. Looking at the evolution of windshields of modern automobiles, there are two very obvious design changes that have occurred over the years. First, a change from flat windshields to a generally convex surface, and second, a change from a vertical orientation to a very steep angle of inclination. The change from flat to convex is a major problem for all types of wipers in that the entire length of the wiper must remain in contact with the surface of the windshield throughout the entire arc of the wipe. Often times, when an incorrect length wiper is installed, the user will notice that there is insufficient flexibility of the wiper to maintain proper downward pressure at the end portions. Furthermore, in modem slanted windshields, wind speed over the surface of the windshields tends to lift the wiper blades off the surface of the window causing streaking of the wiper at moderate vehicle speeds. The curvature and slant of the windshield have thus resulted greater downward pressure of the wiper arm to force the wiper blade into contact with the surface of the windshield. However, the greater pressure of the wiper tends to cause the rubber wiper blades to "set" in locked, nonfucntional position. While these changes have posed many problems for conventional wiper constructions, the problems became greatly exaggerated when dealing with an articulated wiper having male spline which must rotate within a female spline which is flexed over the surface of a curved and slanted windshield.

The answers which eluded the industry and the Applicants for many years were a conflicting combination of the proper amount of flexibility of the female spline to allow the spline to properly conform to the curved surface of the windshield, proper rigidity of the backbone of the wiper to support proper engagement forces with the windshield, proper flexibility of the female spline legs relative to the backbone to prevent the legs from squeezing the male spline too tightly during rotation, and the removal of excess flashing material from the outer surfaces of the male spline.

In this regard, the wiper blade assembly of the present invention includes an elongated, resilient, thin-walled polymeric female spline of relatively high durometer polymeric material having a generally planar backbone, and two opposing arcuate spline legs which extend downwardly from the backbone and cooperate with the backbone to define a cylindrical spline channel. The wiper blade assembly further includes an elastomeric male spline of relatively low durometer elastomeric material having a cylindrical body portion rotatably journaled within the cylindrical spline channel of the female spline. The male spline further includes a neck portion depending from the body portion, and wiping portion depending from the neck portion. The wiping portion includes opposing wiping edges which are alternately engagable with a surface to be wiped upon rotation of the male spline within the cylindrical spline channel.

The key feature in connection with the instant invention is that the spline legs are specifically designed so that they are sufficiently resilient to permit flexure of the spline legs relative to the backbone so as not to bind the male spline during rotation thereof. The main problem in connection with the prior art was that the female spline body was too rigid to permit proper rotation of the male spline when the spline was flexed in the Y-direction. The rigidity of the female spline also caused friction during rotation for several reasons, including friction between the surfaces of the male spline and the channel, and the inability to permit any dirt or dust within the channel. To further reduce friction between the male and female splines, the cylindrical body portion of the male spline is truncated at its uppermost edge. It is believed that the excess flashing material located along the outer edge of the male spline caused friction between the splines and prevented proper rotation during wiping.

Accordingly, among the objects of the instant invention are: the provision of an articulated wiper blade assembly which optimizes "flip" of the wiper blade, i.e., male spline; the provision of a female spline for an articulated wiper blade assembly wherein the backbone and spline legs are provided with a suitable combination of flexibility and rigidity to prevent torsional and lateral flexing of the female spline during use while also providing an acceptable level of flexure in the Y-direction to allow the female spline to properly conform to the curved surface of the windshield and maintain the wiping edge of the male spline in wiping engagement with the curved surface of the windshield along the entire length thereof; the provision of female spline for an articulated wiper blade assembly wherein the female spline includes thin-walled, resilient spline legs which permit some flexure of the spline legs relative to the backbone so as not to bind the male spline during rotation thereof; and the provision of a male spline wiper blade for an articulated wiper blade assembly wherein a cylindrical journaled body portion of the spline is truncated at its uppermost edge to further reduce friction between the body portion of the male spline and the interior channel surface of the female spline.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 4 is a schematic end view of the female spline illustrating selected dimensions thereof;

FIG. 5 is a schematic end view of the male spline illustrating selected dimensions thereof; and FIG. 6 is a schematic end view of the male spline illustrating selected dimensions thereof.

DESCRIPTION OF THE PREFERRED EMBODIMENT

Figure 1:
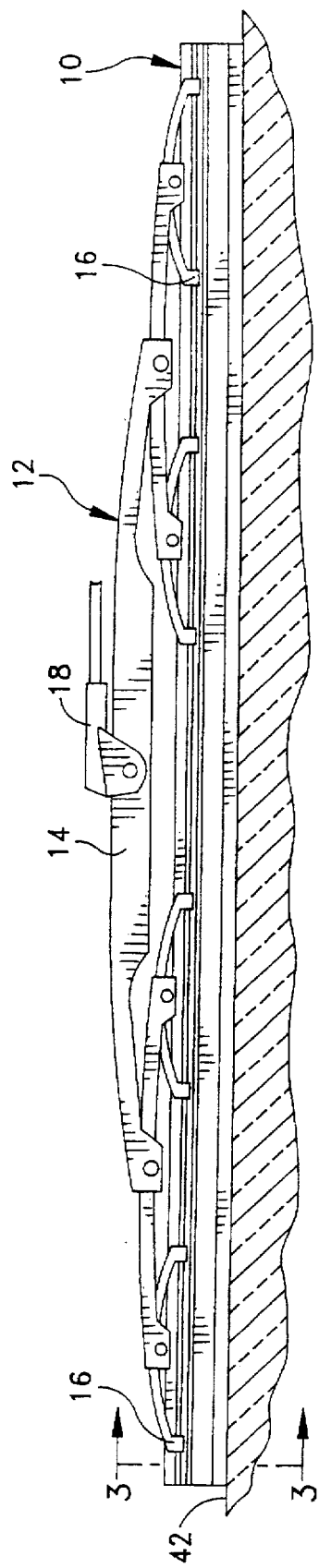
FIG. 1 is an elevational view of a windshield wiper assembly utilizing the articulated wiper blade assembly of the present invention.
Figure 3:
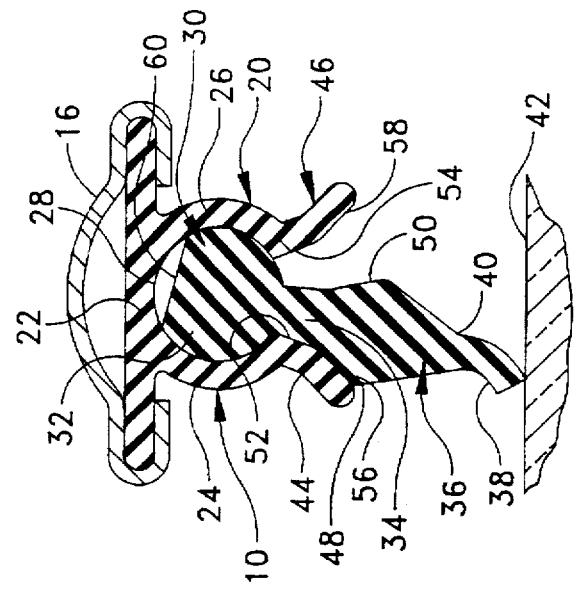
FIG. 3 is a cross-sectional view taken along line 3—3 of FIG. 1.
Figure 2:
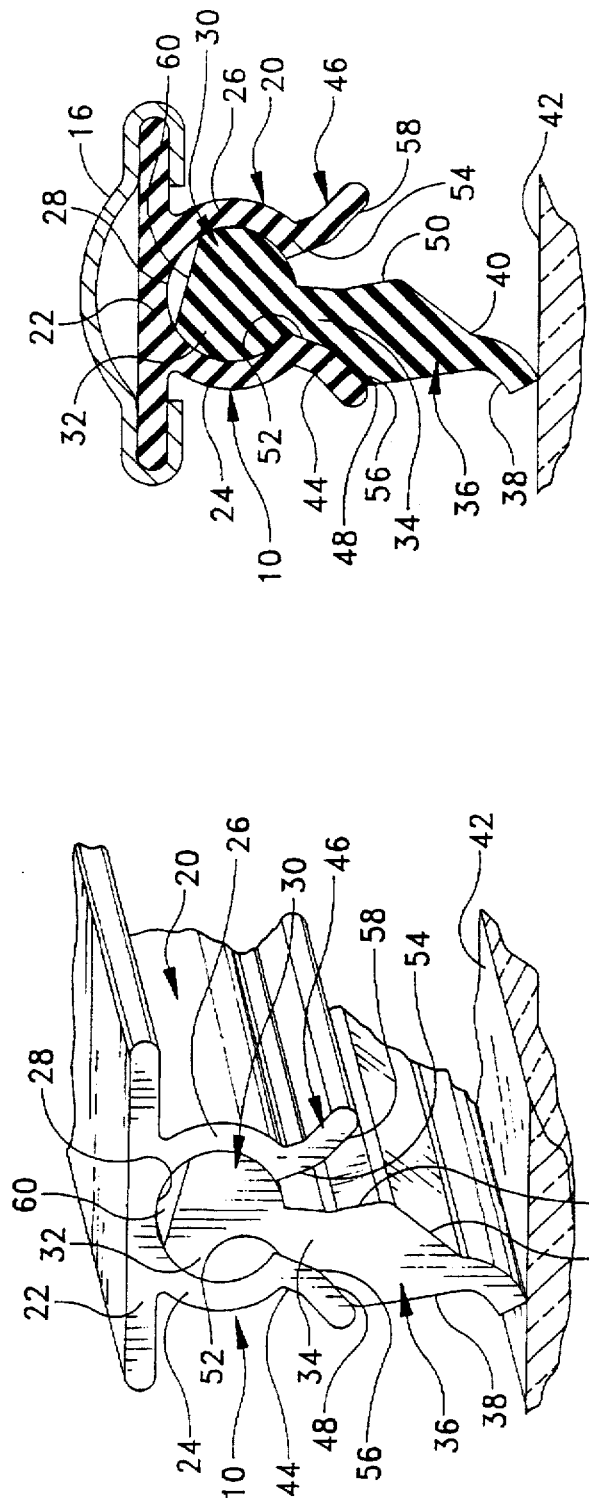
FIG. 2 is an end view taken in the direction of arrow "2" in FIG. 1.

Referring now to the drawings, the articulated wiper blade assembly of the instant invention is illustrated and generally indicated at 10 in FIGS. 1–3. As will hereinafter be more fully described, the instant wiper blade assembly 10 is intended to be received and supported within a windshield wiper assembly generally indicated at 12. More specifically, the windshield wiper assembly 12 comprises a conventional blade holder assembly 14 having a plurality of conventional claws 16. The blade holder assembly 14 is secured to the end of a wiper arm 18 in a conventional manner.

The wiper blade assembly 10 includes an elongated, resilient, thin-walled polymeric female spline generally indicated at 20. The female spline 20 is formed from a relatively high durometer polymeric material (110–130 durometer on the Rockwell R scale) and includes a generally planar backbone 22, and two opposing arcuate spline legs 24, 26 respectively, which extend downwardly from the backbone 22 and cooperate with the backbone 22 to define a cylindrical spline channel 28. More specifically, the female spline is preferably molded or extruded from Noryl PX1278. The specific dimensions of the female spline are listed in Table 1 with reference to FIG. 4.

The wiper blade assembly 10 further includes an elastomeric male spline generally indicated at 30. The male spline 30 is formed from a relatively low durometer elastomeric material (55–65 durometer on the Shore "A" scale) and includes a cylindrical body portion 32 rotatably journaled within the spline channel 28 of the female spline 20. The male spline 30 further includes a neck portion 34 depending from the body portion 32, and a wiping portion generally indicated at 36 depending from the neck portion 34. The wiping portion 36 includes opposing wiping edges 38, 40 which are alternately engagable with a surface 42 to be wiped upon rotation of the male spline 30 within the spline channel 28. The specific dimensions of the male spline are listed in Table 2 with reference to FIGS. 5 and.

The lower terminal ends of each of the spline legs 24, 26 include a flared edge stop generally indicated at 44, 46 respectively, to limit rotation of the male spline 30 to an arc of about 30°. The limited rotation maintains the wiping portion 36 of the male spline is substantially vertical relation to the surface to be wiped. In this regard, the male spline 30 includes opposing shoulder portions 48, 50 adjacent the neck portion 34 thereof. The opposing surfaces of the neck portion 34 of the male spline 30 engage with first generally upright portions 52, 54 respectively, of the edge stops 44, 46 while the shoulder portions 48, 50 of the male spline 30 engage with second angled portions 56, 58 of the edge stops 44, 46. The mating cooperating of the male spline surfaces 34, 48, 50, with the edge stops 44, 46 protects the channel 28 of the female spline 20 against ice and debris accumulation, and further takes advantage of the natural forces of the wind to apply a downward force against the surface 42 being wiped. Turning to FIGS. 5 and 6, the dimensions of the neck portion 34 and wiping portion 36 of the male spline 30 provide sufficient mass and rigidity to the neck portion and the wiping portion to prevent the neck portion and the wiping portion from bending beyond the edge stops 44, 46 of the spline legs during wiping.

The key features in connection with the instant invention are a unique combination of material selection and wall thickness of the constituent parts to provide the proper mass and moment of inertia necessary for proper functionality. More specifically, the unique combination of material and wall thickness provide the female spline backbone 22 with sufficient rigidity to prevent torsional and lateral flexure yet allow sufficient flexure in the Y-direction. The unique combination of material and wall thickness further provide the spline legs 24, 26 with sufficient resilience to permit flexure relative to the backbone 22 so as not to bind the male spline 30 during rotation thereof. As stated previously, the main problem in connection with the prior art was that the female spline body was too rigid to permit proper rotation of the male spline. The rigidity of the female spline is believed to have caused friction during rotation for several reasons, including friction pressure between the surfaces of the male spline and the channel, and the inability to discharge dirt or dust from within the channel. The lack of flexibility in the prior art female splines led to functional failure, i.e., locking of the prior art articulated wiper designs. In this regard, it is noted that the present spline legs 24, 26 have a relatively thin wall thickness which permits greater flexure of the spline legs 24, 26 relative to the backbone 22. In effect, the female cylindrical spline 20 forms a flexible spring channel which is sufficiently rigid to hold the male spline 30 within the channel 28 yet permits flexure of the spline legs 24, 26 to allow rotation of the male spline 30, and permits further flexure along its length so that the wiper properly flexes over the contour of the windshield when mounted.

As an additional improvement to further reduce friction and resistance to rotation, the cylindrical body portion 32 of the male spline 30 is provided with a truncated upper edge portion 60 to reduce friction normally caused by a protruding mold lip formed during molding. In conventional molding of elastomeric materials, a protruding mold lip would normally be created at the upper most portion of the cylindrical body portion of the male spline. This lip is the normal result of the meeting point between the two mold halves used to form the male spline. When the prior art male splines were journaled within the channel, the mold lip rubbed up against the inner wall of the channel creating friction and resistance to rotation. The truncated flat edge 60 of the current design still includes the mold lip. However, the lip is now located in the center of the surface 60 and no longer rubs against the inside wall of the channel 28. The truncated flat spot 60 further provides a discharge channel which can discharge debris and water outwardly at the end of the spline channel 28.

It can therefore be seen that the instant invention provides an articulated wiper blade assembly 10 which optimizes "flip" of the wiper blade, i.e., male spline 30. The provision of thin-walled, resilient spline legs 24, 26 which permit some flexure of the spline legs so as not to bind the male spline 30 during rotation thereof is a key feature critical in achieving the improved performance and operation of the present invention. Furthermore, the provision of a male spline wiper blade wherein the cylindrical journaled body portion of the spline is truncated to further reduce friction between the body portion of the male spline and the interior channel surface of the female spline is another key feature which adds to the highly reliable design of the present invention. For these reasons, the instant invention is believed to represent a significant advancement in the art which has substantial commercial merit.

Although specific dimensions are described herein in Tables 1 and 2, it is to be understood that proportional increases or decreases in the sizes of the female spline and male spline may be possible for either larger or smaller special applications of the wiper in different vehicles. The dimensions specified are intended to represent the best known embodiment for widespread use in automobiles and trucks.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

TABLE 1

FEMALE SPLINE DIMENSIONS
FIG. 4

| Dimension | Preferred Value | Acceptable Range |
|---|---|---|
| $d_1$ | .3350 | ±.1000 |
| $d_2$ | .0300 | ±.0100 |
| $d_3$ | .1416 | ±.0500 |
| $d_4$ | .1680 | ±.0500 |
| $d_5$ | .0167 | ±.0050 |
| $d_6$ | .0810 | ±.0200 |
| $d_7$ | .1920 | ±.0500 |
| $r_1$ | .1250 | ±.0200 |
| $r_2$ | .1800 | ±.0200 |
| $r_3$ | .1150 | ±.0200 |
| $r_4$ | .1430 | ±.0200 |
| $\alpha_1$ | 15° | 10–20° |

(All dimensions are listed in inches. Drawings not to scale.)

TABLE 2

MALE SPINE DIMENSIONS
FIG. 5 AND 6

| | | |
|---|---|---|
| $d_8$ | .3453 | ±.1000 |
| $d_9$ | .0775 | ±.0200 |
| $d_{10}$ | .1170 | ±.0200 |
| $d_{11}$ | .0428 | ±.0100 |
| $d_{12}$ | .1050 | ±.0200 |
| $d_{13}$ | .0320 | ±.0100 |
| $d_{14}$ | .0979 | ±.0200 |
| $d_{15}$ | .0409 | ±.0100 |
| $d_{16}$ | .0890 | ±.0200 |
| $r_5$ | .0600 | ±.0200 |

(All dimensions are listed in inches. Drawings not to scale.)

What is claimed is:

1. An articulated twin spline windshield wiper blade assembly for wiping a curved surface, said assembly comprising:

an elongated, polymeric thin-walled female spline having a generally planar backbone, and two opposing arcuate spline legs which extends downwardly from said backbone, said spline legs cooperating with said backbone to define a cylindrical spline channel therebetween, said female spline being fashioned from a polymeric material having a durometer on the "Rockwell R" scale between about 110 and about 130, said planar backbone having a width $d_1$ generally between about 0.2350 and about 0.4350 inches, and a thickness $d_2$ between about 0.0200 and about 0.0400, said spline legs having a wall thickness between about 0.0350 and about 0.0750 inches;

an elastomeric male spline having a cylindrical body portion rotatably journaled within said spline channel of said female spline, said male spline further including a neck portion depending from said body portion, and a wiping portion depending from said neck portion, said wiping portion including opposing wiping edges which are alternately engageable with a surface to be wiped upon rotation of said male spline within said spline channel, said polymeric material, and said dimensions of said female spline generally providing said female spline with a suitable combination of flexibility and rigidity to prevent torsional and lateral flexing of the female spline during use while also providing an acceptable level of flexure in a Y-direction, towards the curved surface, to allow the female spline to properly conform to the curved surface of the windshield and maintain the wiping edges of the male spline in wiping engagement with the curved surface of the windshield along the entire length thereof, said material and dimensions further providing said spline legs with suitable flexibility relative to the backbone to prevent the spline legs from squeezing the male spline too tightly during simultaneous Y-direction flexure of the female spline and rotation of the male spline there within.

2. The articulated twin spline windshield wiper blade assembly of claim 1 wherein said male spline is fashioned from an elastomeric material having a durometer on the "Shore A" scale between about 55 and about 65.

3. The articulated twin spline windshield wiper blade assembly of claim 2 wherein said spline legs each include downwardly and outwardly flared stops to prevent over rotation of said male spline within said spline channel.

4. The articulated twin spline windshield wiper blade assembly of claim 3 wherein the male spline is truncated along an upper edge portion thereof to minimize friction between the male spline and female spline.

5. The articulated twin spline windshield wiper blade assembly of claim 2 wherein the male spline is truncated along an upper edge portion thereof to minimize friction between the male spline and female spline.

6. The articulated twin spline windshield wiper blade assembly of claim 3 wherein the male spline is truncated along an upper edge portion thereof to minimize friction between the male spline and female spline.

7. The articulated twin spline windshield wiper blade assembly of claim 4 wherein the male spline is truncated along an upper edge portion thereof to minimize friction between the male spline and female spline.

8. The articulated twin spline windshield wiper blade assembly of claim 1 wherein said spline legs each include downwardly and outwardly flared edge stops to prevent over-rotation of said male spline within said spline channel.

9. The articulated twin spline windshield wiper blade assembly of claim 8 wherein said neck portion of said male spline has a thicknesses $d_{11}$ of between about 0.0328 and about 0.0528 inches and said wiping portion has a thickness $d_{12}$ of between about 0.0850 and about 0.1250 inches, said material and dimensions of said male spline providing sufficient mass and rigidity to said neck portion and said wiping portion to prevent said neck portion and said wiping portion from bending beyond the edge stops of the spline legs during wiping.

10. The articulated twin spline windshield wiper blade assembly of claim 9 wherein the male spline is truncated along an upper edge portion thereof to minimize friction between the male spline and female spline.

11. The articulated twin spline windshield wiper blade assembly of claim 8 wherein the male spline is truncated along an upper edge portion thereof to minimize friction between the male spline and female spline.

12. The articulated twin spline windshield wiper blade assembly of claim 9 wherein said neck portion of said male spline has a thicknesses $d_{11}$ of about 0.0428 inches and said wiping portion has a thickness $d_{12}$ of about 0.1050 inches, said material and dimensions of said male spline providing sufficient mass and rigidity to said neck portion and said wiping portion to prevent said neck portion and said wiping portion from bending beyond the edge stops of the spline legs during wiping.

13. The articulated twin spline windshield wiper blade assembly of claim 9 wherein said planar backbone has a width $d_1$ of about 0.3350 inches, and a thickness $d_2$ of about 0.0300 inches, and said spline legs having a wall thickness of about 0.0550 inches.

14. The articulated twin spline windshield wiper blade assembly of claim 13 wherein said neck portion of said male spline has a thicknesses $d_{11}$ of about 0.0428 inches and said wiping portion has a thickness $d_{12}$ of about 0.1050 inches, said material and dimensions of said male spline providing sufficient mass and rigidity to said neck portion and said wiping portion to prevent said neck portion and said wiping portion from bending beyond the edge stops of the spline legs during wiping.

15. The articulated twin spline windshield wiper blade assembly of claim 1 wherein the male spline is truncated along an upper edge portion thereof to minimize friction between the male spline and female spline.

16. The articulated twin spline windshield wiper blade assembly of claim 1 wherein said planar backbone has a width $d_1$ of about 0.3350 inches, and a thickness $d_2$ of about 0.0300 inches, and said spline legs having a wall thickness of about 0.0550 inches.

* * * * *